United States Patent
Indurkar (12) 
(10) Patent No.: US 10,251,064 B1
(45) Date of Patent: Apr. 2, 2019

(54) UNLOCK OF A MOBILE COMMUNICATION DEVICE IN A LOCKED STATE USING A 2-DIMENSIONAL BARCODE

(71) Applicant: Sprint Communications Company L.P., Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/024,683

(22) Filed: Jun. 29, 2018

(51) Int. Cl.
*H04W 12/08* (2009.01)
*H04M 1/725* (2006.01)

(52) U.S. Cl.
CPC ....... *H04W 12/08* (2013.01); *H04M 1/72522* (2013.01)

(58) Field of Classification Search
CPC .. H04N 1/00307; G06K 7/1417; H04W 12/06
USPC ......... 455/466, 414.1; 705/44, 14.23, 14.51; 235/383, 378
See application file for complete search history.

(56) References Cited

U.S. PATENT DOCUMENTS

| | | | |
|---|---|---|---|
| 2008/0142599 A1* | 6/2008 | Benillouche | G06Q 30/02 235/462.41 |
| 2011/0238473 A1* | 9/2011 | Sankolli | G06Q 20/32 705/14.23 |
| 2013/0066783 A1* | 3/2013 | Wolff | G06Q 20/223 705/44 |

* cited by examiner

*Primary Examiner* — Kiet M Doan (57) ABSTRACT

A mobile communication device, comprising: a processor, a non-transitory memory, a radio transceiver, a display, and an application stored in the non-transitory memory. Upon execution by the processor while the mobile communication device is in a locked state, the application receives a request for a unique two-dimensional barcode comprising mobile communication device information based on an input on the mobile communication device. The application then generates the unique two-dimensional barcode and presents the unique two-dimensional barcode on the display of the mobile communication device. The application further receives a one-time use unlock command via the radio transceiver, wherein the one-time use unlock command has been generated based on the unique two-dimensional barcode and releases the mobile communication device from the locked state.

17 Claims, 6 Drawing Sheets

UNLOCK OF A MOBILE COMMUNICATION DEVICE IN A LOCKED STATE USING A 2-DIMENSIONAL BARCODE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices frequently become lost or stolen. Users of lost or stolen mobile communication devices may report a mobile communication device as lost or stolen to a wireless communication service provider. The wireless communication service provider may enter the mobile communication device information into a database of lost or stolen mobile communication devices. The wireless communication service provider may also place a lock on the mobile communication device so that it becomes unusable.

SUMMARY

In an embodiment, a mobile communication device is disclosed. The mobile communication device comprises a processor, a non-transitory memory, a radio transceiver, a display, and an application stored in the non-transitory memory. When executed by the processor while the mobile communication device is in a locked state, the application receives a request for a unique two-dimensional barcode comprising mobile communication device information based on an input on the mobile communication device and generates the unique two-dimensional barcode. The application further presents the unique two-dimensional barcode on the display of the mobile communication device, receives a one-time use unlock command via the radio transceiver, wherein the one-time use unlock command has been generated based on the unique two-dimensional barcode, and releases the mobile communication device from the locked state.

In another embodiment, a method of identifying and authenticating a mobile communication device in a hardware locked state is disclosed. The method comprises receiving a request by an application executing on a mobile communication device for a unique two-dimensional barcode based on an input on the mobile communication device, generating by the application the unique two-dimensional barcode, wherein the two-dimensional barcode comprises mobile communication device information, and presenting by the application the unique two-dimensional barcode on a display of the mobile communication device. The method further comprises receiving by the application an one-time use unlock command comprising a timestamp via the radio transceiver to unlock the mobile communication device, wherein the one-time use unlock command has been generated based on the unique two-dimensional barcode, comparing the timestamp of the one-time use unlock command to the current time, determining that the elapsed time between the current time and the timestamp of the one-time use unlock command is less than a predetermined period of time, and releasing the mobile communication device from the locked state.

In yet another embodiment, a mobile communication device is disclosed. The mobile communication device comprises a processor, a non-transitory memory, a radio transceiver, a display, and an application stored in the non-transitory memory. When executed by the processor while the mobile communication device is in a locked state, the application receives a request for a unique two-dimensional barcode based on an input on the mobile communication device, generates the unique two-dimensional barcode, wherein the two-dimensional barcode comprises mobile communication device information, and presents the unique two-dimensional barcode on the display of the mobile communication device. The application further receives an one-time use unlock command comprising a timestamp via the radio transceiver to unlock the mobile communication device, compares the timestamp of the one-time use unlock command to the current time, determines that the elapsed time between the current time and the timestamp of the one-time use unlock command is less than a predetermined period of time, and releases the mobile communication device from the locked state.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices may be placed in a locked state so that mobile communication device users are not able to access the customary functions of their mobile communication devices. A mobile communication device in a locked state may limit user access to mobile device inputs and/or controls. The locked mobile communication device may restrict some functions of the locked mobile communication device (e.g., browsing the Internet, executing applications, and/or calling other mobile communication devices). A wireless communication service provider may place mobile communication devices in a locked state for a variety of reasons. For example, a wireless communication service subscriber may report a mobile communication device to a wireless communication service provider as lost or stolen. The wireless communication service provider may then remotely lock the mobile communication device so that the mobile communication device becomes partially inaccessible.

A user of a mobile communication device may configure the mobile communication device to request a password authentication in order to provide access to the information and functionality of the mobile communication device. A mobile communication device may become locked if the user repeatedly enters the incorrect password or if the user forgets the password. The password may be a string of characters and/or numbers. Sometimes, the password may be a biometric identifier, such as a fingerprint scan, facial recognition, or iris recognition. One or more circumstances, such as a hardware malfunction, may prevent the mobile communication device from granting access based on the mobile communication device user's biometric. In an embodiment, the mobile communication device may autonomously lock itself after one or more of these conditions have occurred.

It is noted that a mobile communication device in a locked state differs from a mobile communication device in a display locked state that is requesting a password or other user input in order to access functions of the mobile communication device. A mobile communication device in a locked state restricts a mobile device user access to some or all functions of the mobile communication device. For example, a locked mobile communication device may only allow a mobile device user to make emergency (e911) calls, but may restrict other methods of communication (e.g., messaging, emailing, calling). In an embodiment, the hardware components (e.g., processors, radio transceiver, display screen, hardware buttons) of a locked mobile communication device may retain functionality. A display locked mobile communication device allows user access to the functions of the mobile communication device when the password attempt is successful and the mobile communication device is unlocked.

Recovering the usage of a mobile communication device in a locked state may pose a variety of challenges. A wireless communication service provider has to determine that the mobile communication device user who is requesting the unlock of the mobile communication device is the rightful owner of the mobile communication device. In some instances, mobile communication device users with mobile devices in a locked state may be able to release the lock by physically visiting a retail store of the wireless communication service provider. However, this may be unfeasible or inconvenient for the user. The present disclosure teaches a method and systems of unlocking a mobile communication device in a locked state on the device-side using a 2-dimensional (2-D) barcode.

In an embodiment, an unlock application stored in a non-transitory portion of memory of a mobile communication device in a hardware locked state provides authentication for a wireless communication service provider to unlock the mobile communication device remotely. The unlock application may be stored in a system partition of non-transitory memory that is not accessible to a user of the mobile communication device. In some embodiments, the mobile communication device may be referred to as a user equipment (UE). Upon execution by a processor, the unlock application generates a two-dimensional (2-D) barcode in response to an input on the mobile communication device. For example, the input may be a sequence of hardware buttons entered by the mobile communication device user. In another example, a display of the mobile communication device in the hardware locked state may comprise a user-selectable option to generate a 2-D barcode. The 2-D barcode may be one of a Quick Response (QR) code, ShotCode, SemaCode, or any other 2-D barcode.

In an embodiment, information about the mobile communication device and/or wireless communication subscriber may be embedded into the 2-D barcode. Device information may comprise at least one of a mobile equipment identifier (MEID), an international mobile equipment identity (IMEI), electronic serial number (ESN), or any other information about the mobile communication device. Wireless communication subscriber information may comprise a phone number, first name, last name, or any other information. In an embodiment, a timestamp and/or location information may be embedded in the 2-D barcode. The 2-D barcode may store authentication credentials and/or session keys associated with the mobile communication device. The 2-D barcode may comprise information other than mobile communication device information and wireless communication subscriber information.

In an embodiment, the unlock application presents the 2-D barcode on a display of the mobile communication device. The wireless communication subscriber may transmit the 2-D barcode to the wireless communication service provider for authentication. The 2-D barcode may be transmitted in a variety of ways. For example, the wireless communication subscriber may capture an image of the 2-D barcode using a camera and email it to the wireless communication service provider. In another example, the wireless communication subscriber may use a second mobile communication device in an unlocked state to access an authentication portal of the wireless communication service provider and scan the 2-D barcode using a camera associated with the second mobile communication device. In an embodiment, the authentication portal may be a website managed by the wireless communication service provider.

Upon receiving the 2-D barcode, the wireless communication service provider may authenticate the 2-D barcode using a device server. The device server may decode the information (e.g., device information, subscriber information, timestamp, location information) embedded in the 2-D barcode in order to authenticate the mobile communication device. The device server may compare the timestamp embedded in the 2-D barcode to the time the 2-D barcode was received and evaluate the elapsed time against a predefined period of time. For example, if the elapsed time was less than a predefined period of 5 minutes, 15 minutes, 30 minutes, 1 hour, or any other predefined period of time, then the 2-D barcode is valid. The device server may check device information (e.g., MEID, IMEI, ESN) in a database of lost or stolen mobile communication devices maintained by a plurality of wireless communication service providers to ensure that the mobile communication device has not been reported lost or stolen. The device server may look up the account of the wireless communication subscriber using information from the 2-D barcode and further challenge the identity of the wireless communication subscriber. For example, the device server may challenge the wireless communication subscriber with security questions associated with the subscriber's account in order to verify that the rightful owner of the mobile communication device is requesting to unlock the mobile communication device.

In an embodiment, the device server may authenticate the request to unlock the mobile communication device. The device server may transmit a one-time use unlock command to the mobile communication device. The one-time use unlock command may comprise a timestamp. The unlock application may compare the timestamp of the one-time use unlock command to the current time and determine that the elapsed time is less than a predefined period of time in order to prevent fraudulent usage of the one-time use unlock command. The predefined period of time may be 5 minutes, 15 minutes, 30 minutes, 1 hour, or any other predefined period of time such that the one-time use unlock command expires when the elapsed time is greater than the predefined period of time. If the unlock application determines that the predefined period of time of the one-time use unlock command has been exceeded, it may not unlock the locked mobile communication device. In an embodiment, the one-time use unlock command may be configured for a specific mobile communication device. For example, the one-time use unlock command may comprise unique mobile communication device information to prevent fraudulent usage of the one-time use unlock command. The unlock application may not unlock the mobile communication device if it determines that the unique mobile communication device information of the one-time use unlock command does not match the locked mobile communication device.

The use of the one-time use unlock command may be restricted to predetermined geographical regions. The device server may look up a history of frequently visited geographical locations of the mobile communication device. The one-time use unlock command may be restricted to a geographical radius of the history of geographical locations. For example, the one-time use unlock command may be restricted to be effective within a 10 mile radius, a 25 mile radius, a 50 mile radius, or any other predetermined radius. For example, the one-time use unlock command may be determined to be void if the mobile communication device is determined to be in a foreign country and/or outside of the predetermined geographical radius.

In an embodiment, the one-time use unlock command may be restricted to a history of wireless network service set identifiers (WiFi SSIDs). An unlocked mobile communication device may maintain a list of WiFi SSIDs that the mobile communication device has established a connection with in a non-transitory portion of memory. In some instances when the mobile communication device becomes locked, the 2-D barcode may be created and transmitted to the wireless communication service provider for authentication over a local wireless network connection (WiFi). The wireless communication service provider may transmit the one-time use unlock command to the locked mobile communication device over the WiFi network. To prevent fraudulent use of the one-time use unlock command, the unlock application may restrict the use of the one-time use unlock command to when the locked mobile communication device is connected to a WiFi SSID that is on the list of WiFi SSIDs maintained by the mobile communication device.

In an embodiment, the information stored on a mobile communication device in a locked state may be encrypted. In some instances, a wireless communication service provider may not have the authority to unlock an encrypted mobile communication device. The unlock application may embed information in the 2-D barcode that the mobile communication device is encrypted. Upon parsing and authenticating the 2-D barcode, the device server may transmit a one-time use unlock command with instructions to delete the user memory of the mobile communication device before releasing the lock.

Remote locking and unlocking mobile communication devices is a technical problem associated with electronic and/or computer technology. The locking mechanisms are typically implemented in technology as a security measure, to prevent or discourage theft of phones. But sometimes legitimate users of the mobile communication device become locked out of the phone, as described further above. This can make an expensive and important technological asset useless to the owner. The solution of going in to a retail store may not be feasible or may not provide the timely remedy needed by the owner of the phone. In some cases, even taking the phone to a retail store may not make it possible to unlock the phone, because vital private information stored in the phone may not be accessible when locked. The teachings of the present disclosure provide technical solutions to this problem while retaining the desired security protections (e.g., discouraging theft). The disclosure teaches several novel approaches by which a user can perform a process with the service provider to unlock his or her phone without taking it to a retail store involving causing an unlock application on the mobile communication device to present a graphical indication of private information (e.g., generate a 2-D bar code with an embedded time to live value) stored on the device that the service provider can use to unlock the phone, either on-site at a retail location or remotely over the air. The time to live value can be used to reduce fraud. Additionally, when performing a remote unlock, the unlock application may restrict messages from the service provider to be received from a known WiFi access point.

Figure 1:
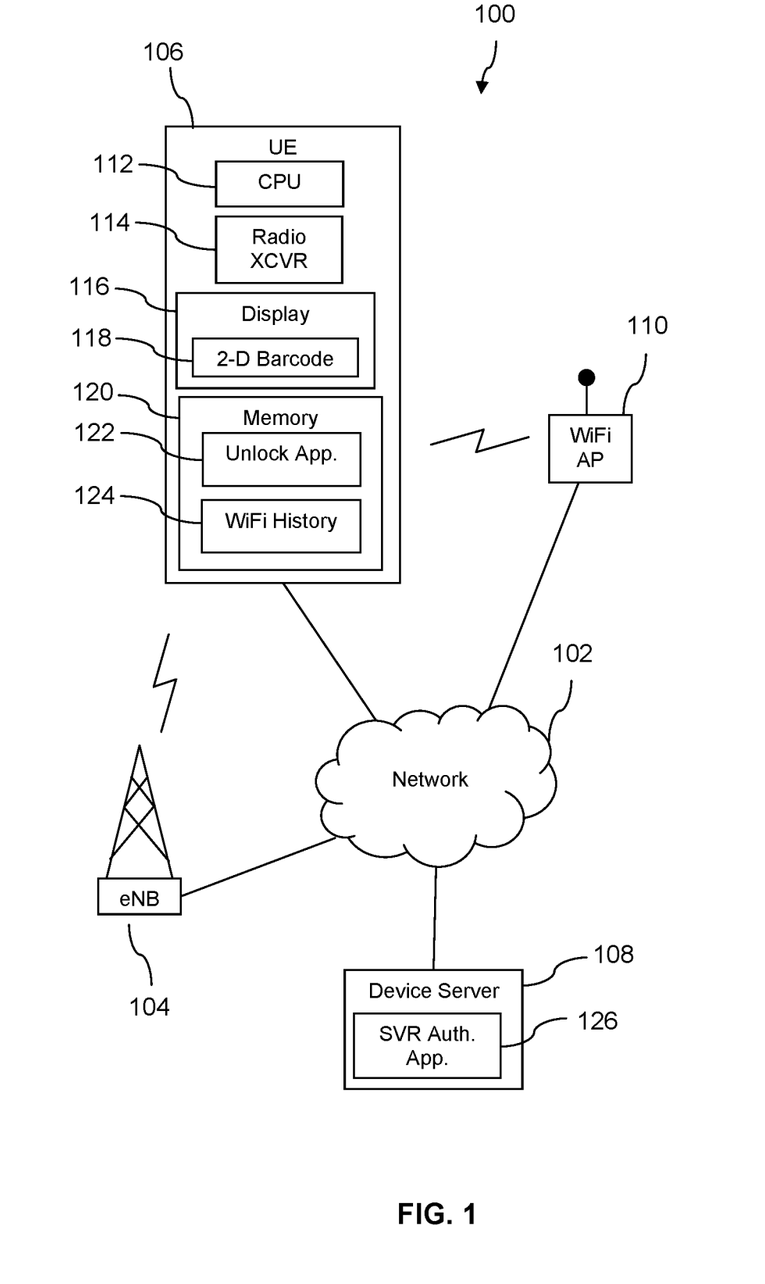
FIG. 1 is a block diagram of a system according to an embodiment of the disclosure.

Turning now to FIG. 1, a system 100 is described. In an embodiment, the system 100 comprises a network 102, an eNodeB (eNB) 104, a user equipment (UE) 106, a device server 108, and a WiFi access point (AP) 110. The network 102 may comprise a public network, a private network, or a combination thereof. It is understood that the system 100 may comprise any number of eNBs 104, UEs 106, device servers 108, and WiFi APs 110. The UE 106 may be referred to as a mobile communication device 106, wherein the mobile communication device 106 is one of a mobile phone, a smart phone, a personal digital assistant (PDA), a wearable computer, a headset computer, a media player, a laptop computer, a notebook computer, or a tablet computer.

In an embodiment, the mobile communication device 106 comprises a central processing unit (CPU) 112, one or more radio transceiver 114, a display 116, and a memory 120 comprising a client unlock application 122 and a history of WiFi names 124. The client unlock application 122 may be encapsulated in an operating system of the mobile communication device 106. The mobile communication device 106 may be communicatively coupled wirelessly to the eNB 104, and the eNB 104 may communicatively couple the UE 106 to the network 102. In some contexts, the eNB 104 may be referred to as a cell site. The radio transceiver 114 may establish wireless communication links with an eNB 104 according to a long-term evolution (LTE), a code division multiple access (CDMA), a global system for mobile communication (GSM), or a worldwide interoperability for microwave access (WiMAX) wireless communication protocol. In another embodiment, the mobile communication device 106 may establish wireless communication links with a WiFi AP 110, and the WiFi AP 110 may communicatively couple the UE 106 to the network 102.

In an embodiment, the mobile communication device 106 may become locked for a variety of reasons. For example, the mobile communication device 106 may challenge a user to provide password authentication in order to access the functionality of the mobile communication device 106. The password authentication may be one of a string of characters and/or numbers, a biometric identifier (e.g., fingerprint scan, facial recognition, iris recognition). A mobile communication device 106 may become locked if the user repeatedly enters the incorrect password or if the user forgets the password. One or more circumstances, such as a hardware malfunction, may prevent the mobile communication device 106 from granting access based on the mobile communication device user's biometric. In an embodiment, the mobile communication device 106 may autonomously lock itself after one or more of these conditions have occurred.

In an embodiment, the mobile communication device user may desire to unlock the locked mobile communication device 106. The client unlock application 122 receives a request to generate a unique 2-D barcode 118 comprising information of the mobile communication device 106 based on an input on the mobile communication device 106. While the mobile communication device 106 is in the locked state, the CPU 112 may still execute instructions (e.g., the client unlock application 122) and respond to hardware inputs, but the device 106 may not perform customary user functions such as executing user mobile applications and presenting results on the display 116, providing user access to phone functionality (excepting possibly e911 call origination), providing user access to Internet browsing, providing user access to email. For example, the input may comprise the mobile communication device user pushing hardware buttons on the mobile communication device 106 in a predetermined sequence or selecting an option presented on the display 116 to generate a unique 2-D barcode 118. The client application 122 may generate the unique 2-D barcode 118 and present it on the display 116 of the mobile communication device 106. The unique 2-D barcode 118 may be one of a Quick Response (QR) code, a ShotCode, a Semacode, or any other 2-D barcode that comprises embedded information. The unique 2-D barcode 118 may embed information about the locked mobile communication device 106 such as at least one of a mobile equipment identifier (MEID), an international mobile equipment identity (IMEI), a serial number, or mobile communication device subscriber information. Furthermore, the unique 2-D barcode 118 may embed a timestamp and/or location information of the mobile communication device 106 when the unique 2-D barcode 118 is generated by the unlock application 122.

In an embodiment, the wireless communication subscriber may transmit the unique 2-D barcode 118 to the wireless communication service provider for authentication. The unique 2-D barcode 118 may be transmitted in a variety of ways. For example, the wireless communication subscriber may capture an image of the unique 2-D barcode 118 using a camera separate from the mobile communication device 106 and email it to the wireless communication service provider. In another example, the wireless communication subscriber may use a second mobile communication device in an unlocked state to access an authentication portal of the wireless communication service provider and scan the unique 2-D barcode 118 using a camera associated with the second mobile communication device. In an embodiment, the authentication portal may be a website managed by the wireless communication service provider.

Upon receiving the 2-D barcode, a server authentication application 126 executing on the device server 108 may authenticate the unique 2-D barcode 118 with a wireless communication service provider. The server authentication application 126 may decode the information (e.g., device information, subscriber information, timestamp, location information) embedded in the unique 2-D barcode 118 in order to authenticate the locked mobile communication device 106. The server authentication application 126 may compare the timestamp embedded in the unique 2-D barcode 118 to the time the 2-D barcode 118 was received and evaluate the elapsed time against a predefined period of time. For example, if the elapsed time was less than a predefined period of 5 minutes, 15 minutes, 30 minutes, 1 hour, or any other predefined period of time, then the 2-D barcode 118 is valid. The server authentication application 126 may check device information (e.g., MEID, IMEI, ESN) in a database of lost or stolen mobile communication devices maintained by a plurality of wireless communication service providers to ensure that the mobile communication device 106 has not been reported lost or stolen. The server authentication application 126 may look up the account of the wireless communication subscriber using information from the 2-D barcode 118 and further challenge the identity of the wireless communication subscriber. For example, the server authentication application 126 may challenge the wireless communication subscriber with security questions associated with the subscriber's account in order to verify that the rightful owner of the mobile communication device 106 is requesting to unlock the mobile communication device 106.

In an embodiment, the server authentication application 126 may authenticate the request to unlock the mobile communication device 106. The server authentication application 126 may transmit a one-time use unlock command to the mobile communication device 106. The one-time use unlock command may comprise one or more constraints associated with the mobile communication device 106. The constraints may be one or more of a timestamp constraint, a location constraint, a mobile communication device identity constraint, a wireless network service set identifier (WiFi SSID) constraint, or any other constraint. The unlock application 122 may receive the one-time use unlock command over the network 102 and compare the one or more constraints with the current conditions of the locked mobile communication device 106 to prevent fraudulent use of the one-time use unlock command. The unlock application 122 may release the mobile communication device 106 from the locked state when it determines that the one-time use unlock command is associated with a valid mobile communication device 106.

In an embodiment, the one-time use unlock command may comprise a timestamp constraint. The unlock application 122 may compare the timestamp of the one-time use unlock command to the current time of the mobile communication device 106 and determine that the elapsed time is less than a predefined period of time in order to prevent fraudulent usage of the one-time use unlock command. The predefined period of time may be 5 minutes, 15 minutes, 30 minutes, 1 hour, or any other predefined period of time such that the one-time use unlock command expires when the elapsed time is greater than the predefined period of time. The unlock application 122 may release the mobile communication device 106 from the locked state if it determines that the predefined period of time has not been exceeded. If the unlock application 122 determines that the predefined period of time of the one-time use unlock command has been exceeded, it may not unlock the locked mobile communication device 106.

In an embodiment, the one-time use unlock command may be configured for a specific mobile communication device 106. For example, the one-time use unlock command may comprise unique mobile communication device information to prevent fraudulent usage of the one-time use unlock command. Mobile communication device information may be one or more of a mobile equipment identifier (MEID), an international mobile equipment identity (IMEI), a serial number, or mobile communication subscriber information. For example, the unlock application 122 may compare the MEID of the one-time use unlock command to the MEID of the locked mobile communication device 106 and release the mobile communication device 106 from the locked state if the mobile communication device information matches. The unlock application 122 may not unlock the mobile communication device 106 if it determines that the unique mobile communication device information of the one-time use unlock command does not match the locked mobile communication device 106.

In an embodiment, the unlock application 122 may compare a location constraint associated with the one-time use unlock command with the location history of the mobile communication device 106. The server authentication application 126 may look up a history of frequently visited geographical locations of the locked mobile communication device 106. The use of the one-time use unlock command may be restricted to predetermined geographical regions. For example, the one-time use unlock command may be restricted to be effective within a 10 mile radius, a 25 mile radius, a 50 mile radius, or any other predetermined radius. The client application 122 may void one-time use unlock command if the mobile communication device 106 is determined to be in a foreign country and/or outside of the predetermined geographical radius.

In an embodiment, the mobile communication device 106 may maintain a history of wireless network service set identifiers (WiFi SSIDs) 124 of WiFi APs 110 that it has connected to while in its unlocked state. The history of WiFi SSIDs 124 may comprise a list of names of WiFi APs 110 that the mobile communication device 106 has previously established a connection. An unlocked mobile communication device 106 may store the history of WiFi SSIDs 124 in a non-transitory portion of memory 120. The one-time use unlock command may comprise a wireless network service set identifier (WiFi SSID) constraint and be restricted to a history of WiFi SSIDs 124 of the locked mobile communication device 106. The unlock application 122 may compare the WiFi SSID constraint of the one-time use unlock command to the history of WiFi SSIDs 124 stored on the locked mobile communication device 106 and determine that the one-time use unlock command is associated with a valid mobile communication device 106 before releasing the mobile communication device 106 from the locked state.

In some instances when the mobile communication device 106 becomes locked, the 2-D barcode 118 may be created and transmitted to the wireless communication service provider for authentication over a local wireless network connection (WiFi). The wireless communication service provider may transmit the one-time use unlock command to the locked mobile communication device 106 over the WiFi network. To prevent fraudulent use of the one-time use unlock command, the unlock application 122 may restrict the use or execution of the one-time use unlock command to when the locked mobile communication device 106 is connected to a WiFi AP 110 that is in the history of WiFi SSIDs 124 maintained by the mobile communication device 106. Alternatively, the unlock application 122 may restrict the use or execution of the one-time use unlock command to when the locked mobile communication device 106 detects but is not connected to a WiFi AP 110 that is in the history of WiFi SSIDs 124.

In an embodiment, the information stored on a mobile communication device 106 in a locked state may be encrypted. In some instances, a wireless communication service provider may not have the authority to unlock an encrypted mobile communication device 106. The unlock application 122 may embed information in the 2-D barcode 118 that the mobile communication device 106 is encrypted. Upon parsing and authenticating the 2-D barcode 118, the server authentication application 126 may transmit a one-time use unlock command with instructions to delete the user memory 120 of the mobile communication device 106 before releasing the lock.

Figure 2:
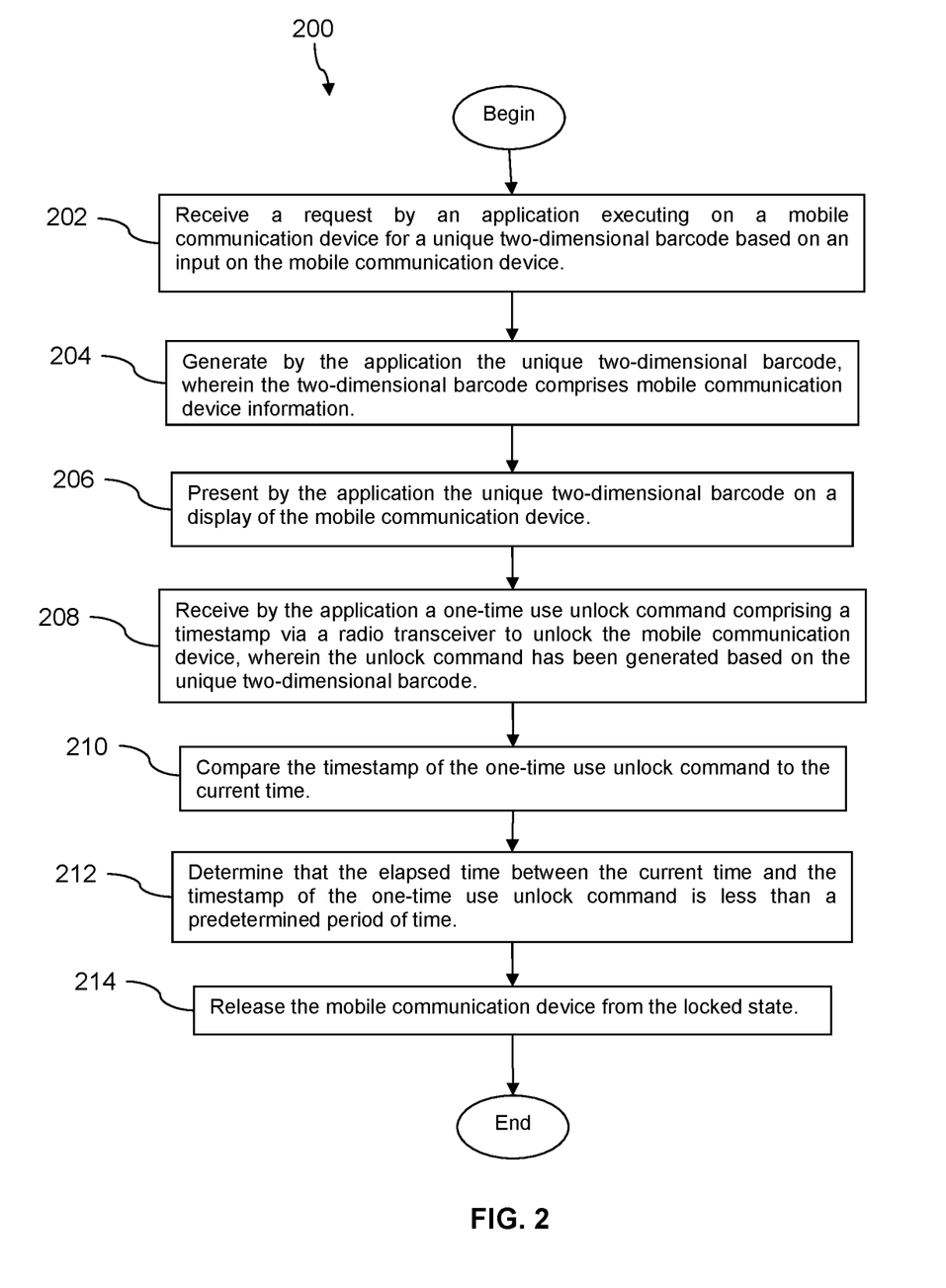
FIG. 2 is a flow chart of a method according to an embodiment of the disclosure.

Turning now to FIG. 2, a method 200 is described. The method 200 may be used to identify and authenticate a mobile communication device 106 in a locked state. At block 202, an application executing on a mobile communication device receives a request for a unique two-dimensional barcode based on an input on the mobile communication device. In an embodiment, the input on the mobile communication device may be pushing hardware buttons in a pre-defined sequence on the mobile communication device. At block 204, the application generates the unique two-dimensional barcode, wherein the two-dimensional barcode comprises mobile communication device information. At block 206, the application presents the unique two-dimensional barcode on a display of the mobile communication device.

At block 208, the application receives a one-time use unlock command comprising a timestamp via a radio transceiver to unlock the mobile communication device, wherein the one-time use unlock command has been generated based on the unique two-dimensional barcode. At block 210, the timestamp of the one-time use unlock command is compared to the current time. At block 212, the elapsed time between the current time and the timestamp of the one-time use unlock command is determined to be less than a predetermined period of time. For example, the predetermined period of time may be a period of 5 minutes, 15 minutes, 30 minutes, 1 hour, or any other predefined period of time. At block 214, the mobile communication device is released from the locked state.

Figure 3:
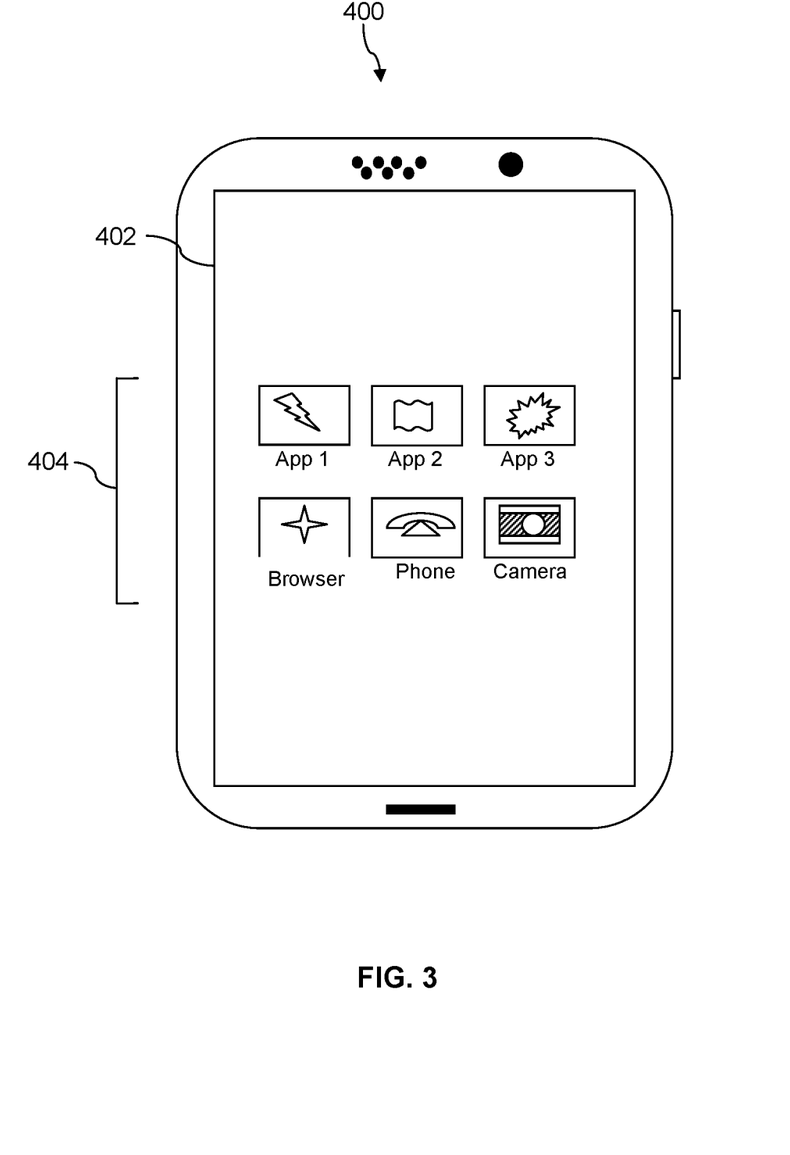
FIG. 3 is a block diagram of a user equipment (UE) according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
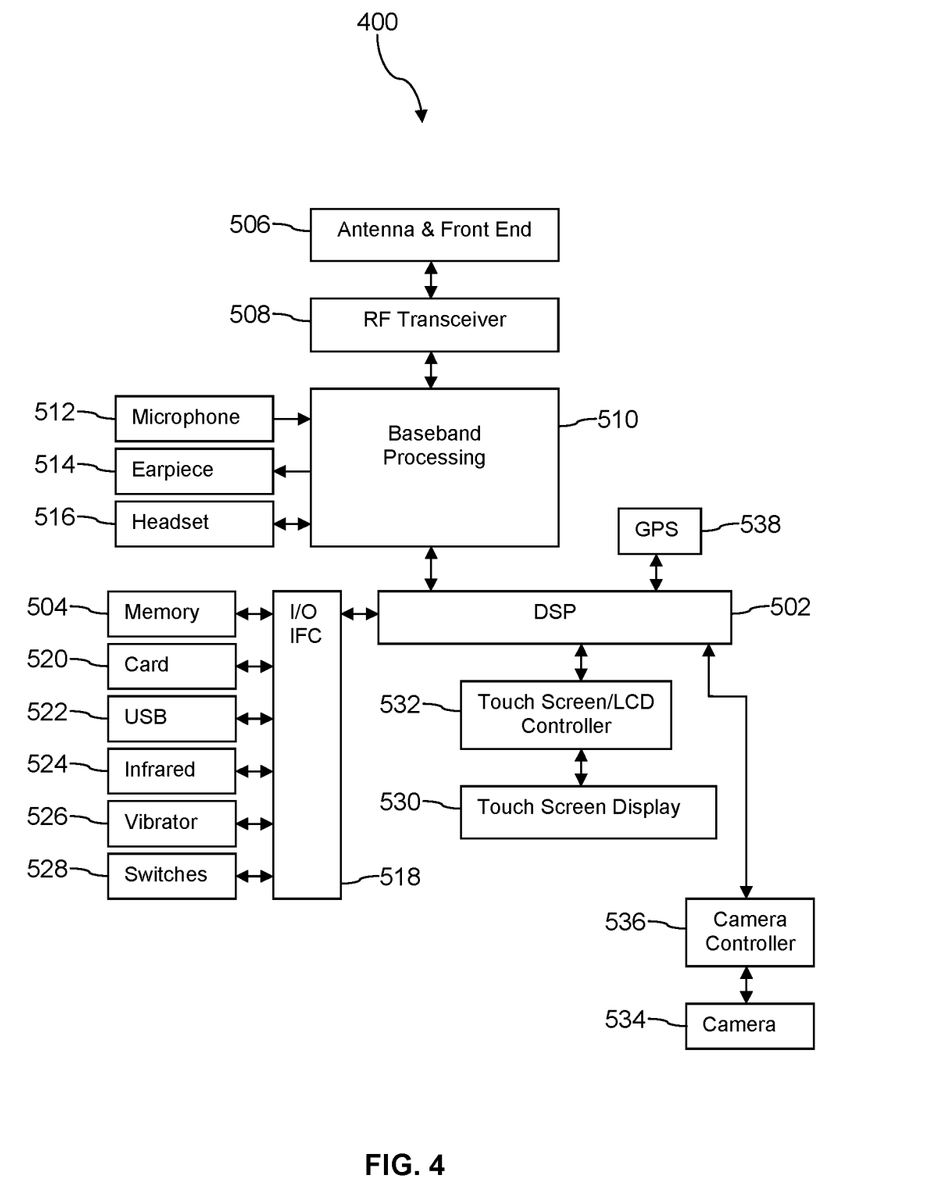
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
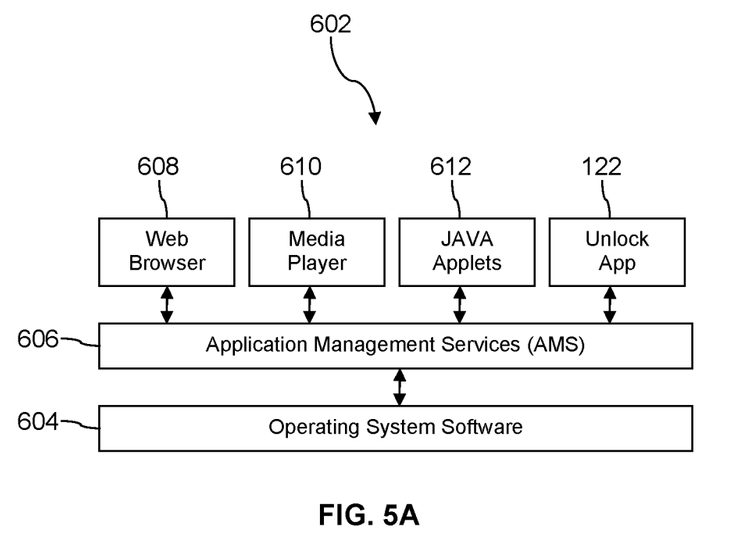
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality including the functionality of the unlock application 122.

Figure 5B:
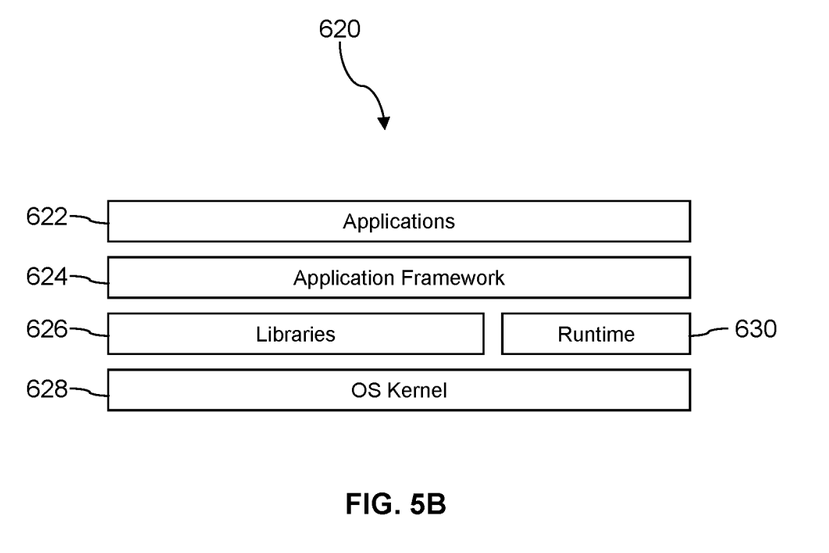
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
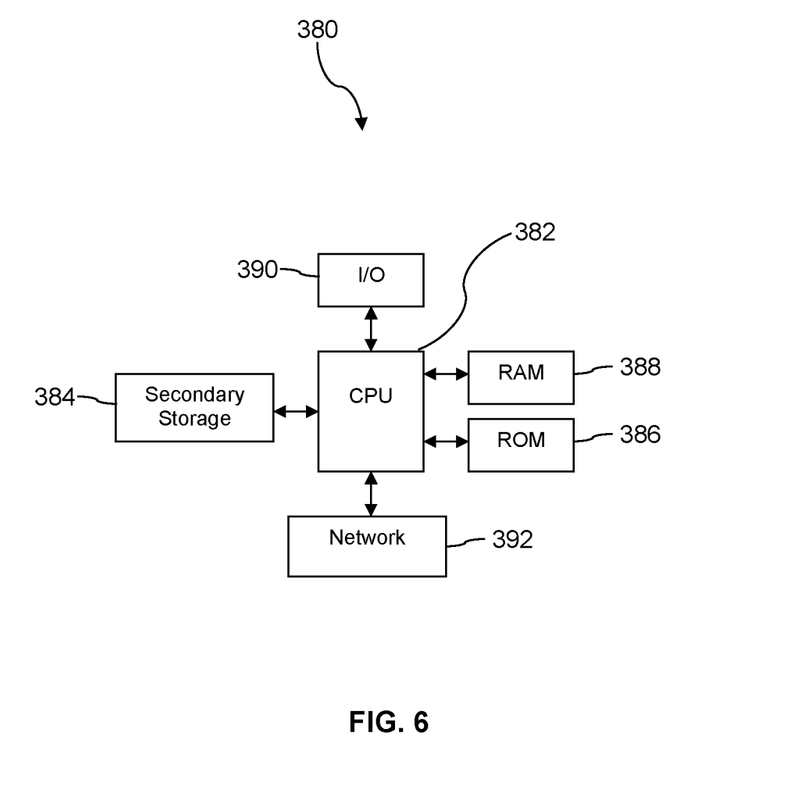
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of identifying and authenticating a mobile communication device in a locked state, comprising:
   receiving a request by an application executing on a mobile communication device for a unique two-dimensional barcode based on an input on the mobile communication device;
   generating by the application the unique two-dimensional barcode, wherein the two-dimensional barcode comprises mobile communication device information;
   presenting by the application the unique two-dimensional barcode on a display of the mobile communication device;
   maintaining by the mobile communication device a history of wireless network service set identifiers (WiFi SSIDs) stored in a non-transitory memory that the mobile communication device has established a connection;
   establishing a connection by the mobile communication device to a wireless communication network via a WiFi access point (AP) comprising a WiFi SSID;
   receiving by the application a one-time use unlock command comprising a timestamp via the WiFi AP using the radio transceiver to unlock the mobile communication device, wherein the one-time use unlock command has been generated based on the unique two-dimensional barcode;
   locating the WiFi SSID of the WiFi AP to the history of WiFi SSIDs maintained by the mobile communication device;
   comparing the timestamp of the one-time use unlock command to the current time;

determining that the elapsed time between the current time and the timestamp of the one-time use unlock command is less than a predetermined period of time; and releasing the mobile communication device from the locked state.

2. The method of claim 1, further comprising resetting the mobile communication device to factory default settings before unlocking the mobile communication device from the locked state.

3. The method of claim 1, wherein the predetermined period of time is 5 minutes, 15 minutes, 30 minutes, or 1 hour.

4. The method of claim 1, wherein mobile communication device information comprises at least one of a mobile equipment identifier (MEID), an international mobile equipment identity (IMEI), a serial number, or mobile communication device subscriber information.

5. The method of claim 1, wherein the mobile communication device is one of a mobile phone, a smart phone, a personal digital assistant (PDA), a wearable computer, a headset computer, a media player, a laptop computer, a notebook computer, or a tablet computer.

6. The method of claim 1, wherein the radio transceiver establishes wireless communication links with a cell site according to a long term evolution (LTE) protocol, a code division multiple access (CDMA) protocol, a global system for mobile communication (GSM) protocol, or a worldwide interoperability for microwave access (WiMAX) wireless communication protocol.

7. A mobile communication device, comprising:
a processor;
a non-transitory memory that comprises a history of wireless network service set identifiers (WiFi SSIDs) that the mobile communication device has established a connection, wherein the history is maintained by the mobile communication device;
a radio transceiver;
a display; and
an application stored in the non-transitory memory that, when executed by the processor while the mobile communication device is in a locked state;
receives a request for a unique two-dimensional barcode based on an input on the mobile communication device;
generates the unique two-dimensional barcode, wherein the two-dimensional barcode comprises mobile communication device information;
presents the unique two-dimensional barcode on the display of the mobile communication device;
establishes a connection by the mobile communication device to a wireless communication network via a WiFi access point (AP) comprising a WiFi SSID;
receives a one-time use unlock command comprising a timestamp via the WiFi AP using the radio transceiver to unlock the mobile communication device;
locate the WiFi SSID of the WiFi AP to the history of WiFi SSIDs stored in the non-transitory memory and maintained by the mobile communication device;
compares the timestamp of the one-time use unlock command to the current time;
determines that the elapsed time between the current time and the timestamp of the one-time use unlock command is less than a predetermined period of time; and
releases the mobile communication device from the locked state.

8. The mobile communication device of claim 7, wherein the two-dimensional barcode is one of a Quick Response (QR) code, a ShotCode, or a Semacode.

9. The mobile communication device of claim 7, wherein the predetermined period of time is 5 minutes, 15 minutes, 30 minutes, or 1 hour.

10. The mobile communication device of claim 7, wherein the unique two-dimensional barcode comprises location information.

11. The mobile communication device of claim 7, wherein the mobile communication device is one of a mobile phone, a smart phone, a personal digital assistant (PDA), a wearable computer, a headset computer, a media player, a laptop computer, a notebook computer, or a tablet computer.

12. The mobile communication device of claim 7, wherein the radio transceiver establishes wireless communication links with a cell site according to a long term evolution (LTE) protocol, a code division multiple access (CDMA) protocol, a global system for mobile communication (GSM) protocol, or a worldwide interoperability for microwave access (WiMAX) wireless communication protocol.

13. A mobile communication device, comprising:
a processor;
a non-transitory memory that comprises a history of wireless network service set identifiers (WiFi SSIDs) that the mobile communication device has established a connection, wherein the history is maintained by the mobile communication device;
a radio transceiver;
a display; and
an application stored in the non-transitory memory that, when executed by the processor while the mobile communication device is in a locked state;
receives a request for a unique two-dimensional barcode comprising mobile communication device information based on an input on the mobile communication device;
generates the unique two-dimensional barcode, wherein the two-dimensional barcode comprises mobile communication device information;
presents the unique two-dimensional barcode on the display of the mobile communication device;
establishes a connection by the mobile communication device to a wireless communication network via a WiFi access point (AP) comprising a WiFi SSID;
receives a one-time use unlock command via the WiFi AP using the radio transceiver, wherein the one-time use unlock command has been generated based on the unique two-dimensional barcode, and wherein the one-time use unlock command comprises at least one constraint including a timestamp;
locate the WiFi SSID of the WiFi AP to the history of WiFi SSIDs stored in the non-transitory memory and maintained by the mobile communication device;
compares the at least one constraint of the one-time use unlock command including the timestamp to current conditions of the locked mobile communication device;
determines that the current conditions on the mobile communication device conform to the at least one constraint of the one-time use unlock command including determining that the elapsed time between the current time and the timestamp of the one-time use unlock command is less than a predetermined period of time; and releases the mobile communication device from the locked state.

14. The mobile communication device of claim 13, wherein two-dimensional barcode is one of a Quick Response (QR) code, a ShotCode, or a Semacode.

15. The mobile communication device of claim 13, wherein mobile communication device information comprises at least one of a mobile equipment identifier (MEID), an international mobile equipment identity (IMEI), a serial number, or mobile communication subscriber information.

16. The mobile communication device of claim 15, wherein mobile communication device information is embedded in the unique two-dimensional barcode.

17. The mobile communication device of claim 13, wherein the at least one constraint is at least one of a timestamp constraint, a location constraint, or a mobile communication device identity constraint.

* * * * *